(12) United States Patent
Hashizume et al.

(10) Patent No.: US 6,407,886 B1
(45) Date of Patent: Jun. 18, 2002

(54) TAPE CASSETTE HAVING A BIASED LOCKED MEMBER

(75) Inventors: Kenji Hashizume; Shinichi Sato, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/557,905

(22) Filed: Apr. 21, 2000

(51) Int. Cl.[7] ............................................. G11B 23/087
(52) U.S. Cl. ..................... 360/132; 242/338; 242/347.1
(58) Field of Search .............................. 360/96.5, 132; 242/338, 338.2, 343, 347.1

(56) References Cited

U.S. PATENT DOCUMENTS

| | | | |
|---|---|---|---|
| 4,660,784 A | * 4/1987 | Sumida et al. | 242/338 |
| 5,075,812 A | * 12/1991 | Lee | 360/132 |
| 5,143,317 A | * 9/1992 | Sugiyama | 242/343 |
| 5,321,571 A | * 6/1994 | Enomoto et al. | 360/132 |
| RE34,927 E | * 5/1995 | Meguro et al. | 360/96.5 |

FOREIGN PATENT DOCUMENTS

| | | |
|---|---|---|
| EP | 1047072 | * 10/2000 |
| JP | 62-189687 | 8/1987 |
| JP | 63-234478 | 9/1988 |
| JP | 4-57264 | 2/1992 |
| JP | 11-306718 | * 11/1999 |

* cited by examiner

*Primary Examiner*—Jefferson Evans
(74) *Attorney, Agent, or Firm*—Darby & Darby

(57) ABSTRACT

A tape cassette having a case body including an upper case and a lower case, a recessed portion formed on the side of a lower surface of the case body, and a slider so provided in the case body as to be slidable for opening and closing the recessed portion, is disclosed. The tape cassette further has a lock member positioned at an opening of the lower case to lock the slider in respective positions where the recessed portion is closed and opened, and a biasing member, supported at its two side ends with the opening being interposed therebetween by an inner surface of the lower case, for biasing the slider to a lock position.

13 Claims, 15 Drawing Sheets

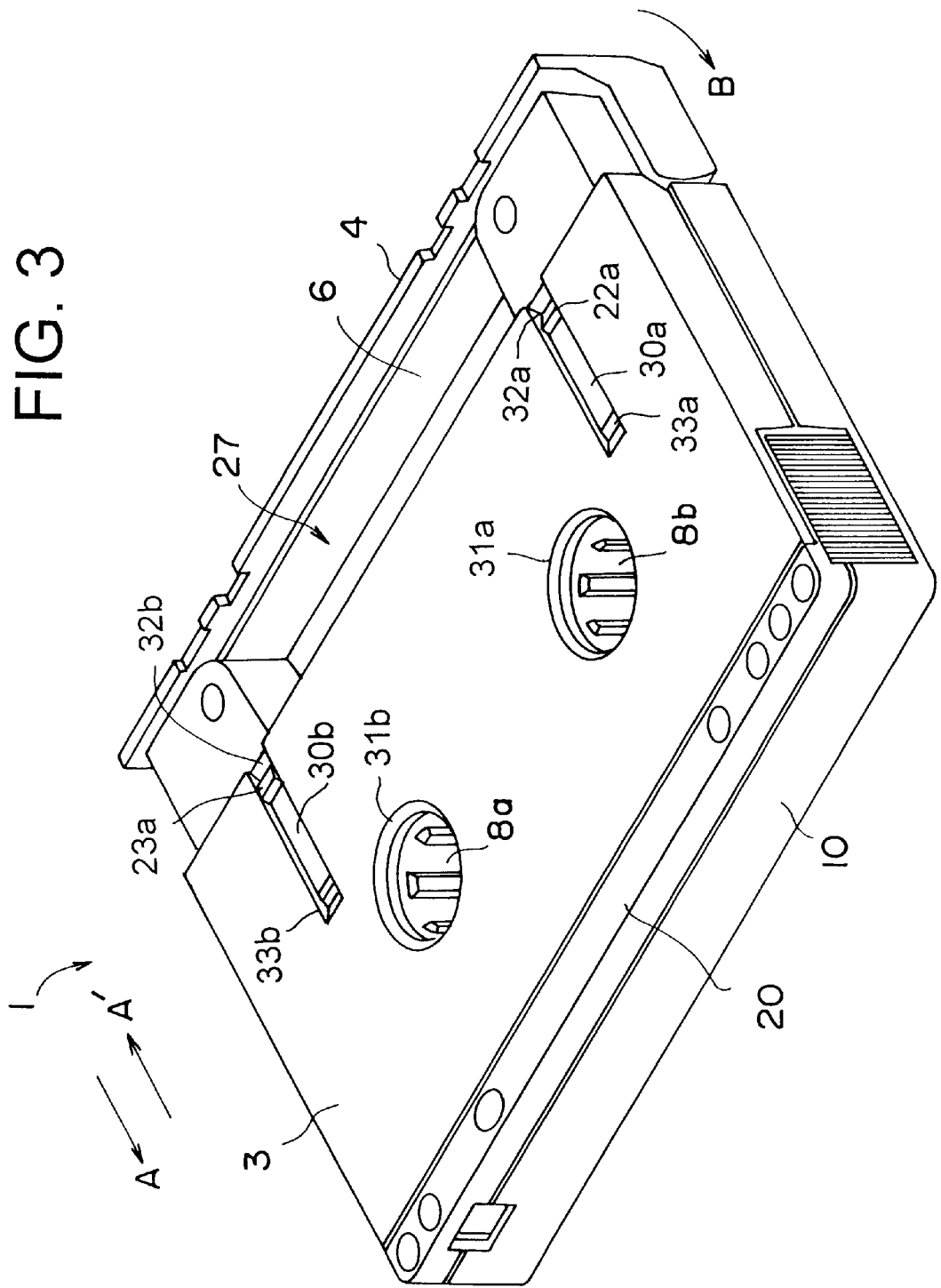

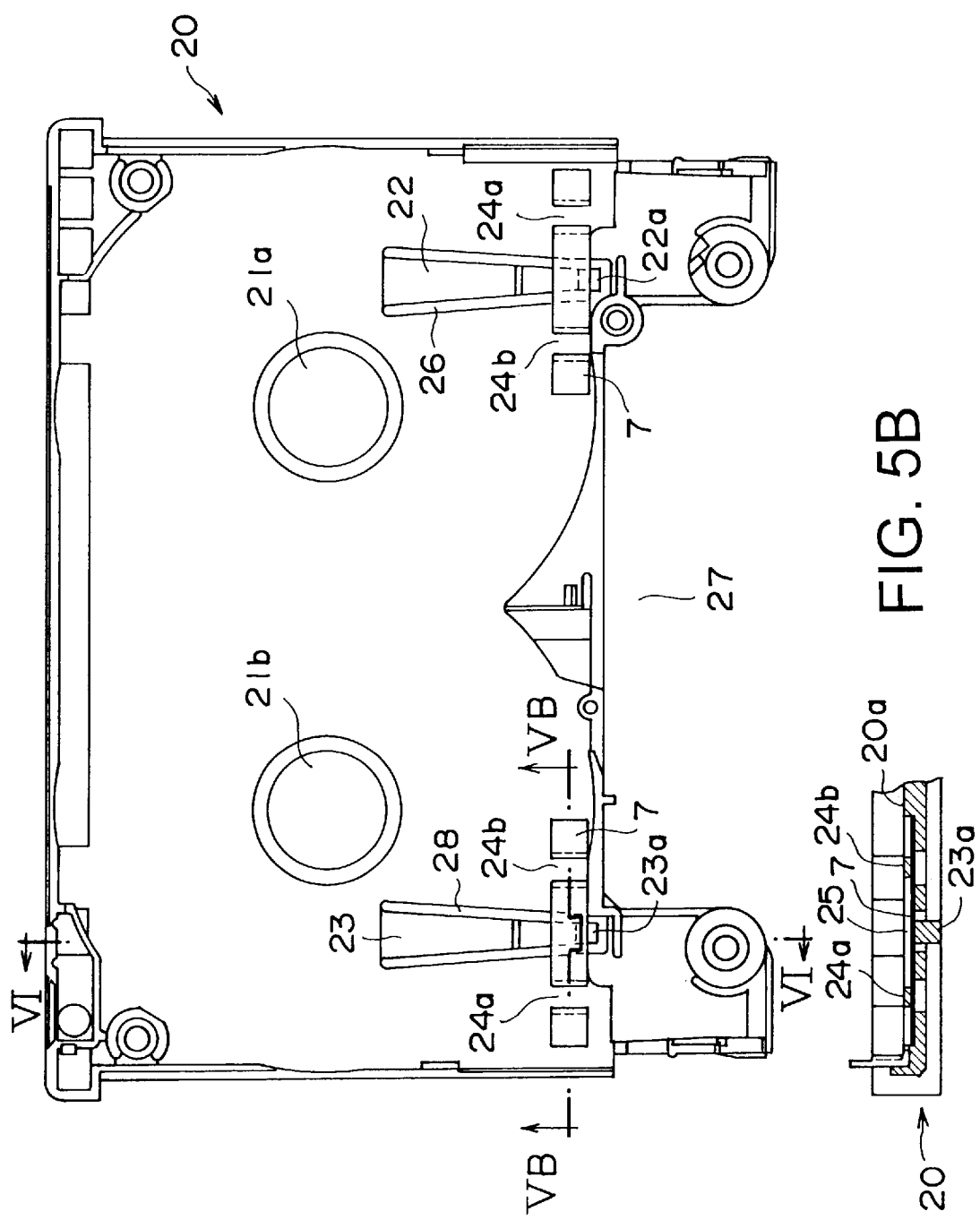

TAPE CASSETTE HAVING A BIASED LOCKED MEMBER

BACKGROUND OF THE INVENTION

1. Field of the Invention

The present invention relates to a tape cassette having a slider lock for a DDS (Digital Data Storage), a DAT (Digital Audio Tape), etc.

2. Related Background Art

A conventional tape cassette having a slider lock is disclosed in, e.g., Japanese Patent Application Laid-Open Publication No. 62-189687. An example of this prior art will be explained referring to FIG. 10. A body case 100 includes an upper case 100a and a lower case 100b. A bottom wall 400 of the body case 100 is provided with a shutter (slider) 101 in a slidable manner, and integrally with a lock member 190. An engagement portion 210 provided at a front side end 190a of the lock member 190 engages with an engagement hole 310 of the shutter 101. A coil spring 220 for biasing the front side end 190a downward in FIG. 10 is disposed between an inner surface of the upper case 100a and an upper surface of the front side end 190a of the lock member 190. The coil spring 220 presses downward the engagement portion 210 of the lock member 190, thereby locking the shutter 101. Incidentally, upon a release from the locking by the engagement portion 210 of the lock member 190, the shutter 101 slides leftward in FIG. 10, and similarly engages with an engagement hole 300 and is thus locked.

FIG. 11 shows a slider lock structure disclosed in Japanese Patent Application Laid-Open Publication No. 63-34478. This slider lock structure is that a lock member 160 is pressed downward in FIG. 11(a) by a spring arm 221 of a plate spring 211 attached while being bent in an L-shape to a cylindrical tape guide 70 of a lower case 100b, thus locking. The plate spring 211 is held such that a fitting portion 230 is inserted into a groove 300 formed in the tape guide 70. In this case, as illustrated in FIG. 11(b), the fitting portion 230 is formed with an elastic engagement member 270 which overhangs and is fitted by pressure into the groove 300.

FIG. 12 shows another slider lock structure disclosed in Japanese Patent Application Laid-Open Publication No. 4-57264. As shown in FIG. 12(a), a plate spring 201 secured by welding in the vicinity of the center of a lower case 100b extends in a cantilever type to a lock member 161 on sides of side ends of the case, and the lock member 161 is pressed by front side ends 202 of the plate spring 201 in a rear-side direction on the sheet surface, thus locking it.

According to the prior art shown in FIG. 10, however, the coil spring 220 is unable to exhibit its effect unless the upper and lower cases 1001, 100b are assembled. Therefore, the slider is biased forward by the slider spring. If the locking force is insufficient, there might be a possibility of causing such a trouble that the slider comes off in the assembly process. Further, the coil spring 220 exists in a whole-thicknesswise direction of the inner surface of the case 100, and hence, if the tape slackens, there might be a possibility in which the tape comes into contact with the coil spring 220. Moreover, the prior art coil spring is provided with a narrow-pitch portion in the spring element in order to prevent the spring wires from entangling with each other. This leads to an increase in quantity of materials to be used and a rise in manufacturing costs as well.

Further, according to the prior art shown in FIG. 11A, the structure for fitting and holding the plate spring 211 to the tape guide is complicated, and therefore the structure of the plate spring 210 becomes also complicated as seen in the fitting portion 230 having the elastic engagement member 270 as shown in FIG. 11B. Therefore, the plate spring is formed with a difficulty, resulting in a rise in the manufacturing costs.

Moreover, according to the prior art shown in FIG. 12A, the plate spring 201 is fitted to the case by welding, and hence, the number of assembling processes increases, which leads to the increase in the manufacturing costs. Further, as shown in FIG. 12B, a welding portion 222 of the plate spring 201 is formed in swelling and consequently the spring protrudes from the inner surface of the case, with the result that an adverse influence is exerted on running of the tape. Moreover, the lock members 161 are pressed by the front side ends of the plate spring 201 in the cantilever type, and hence the front side ends 202 become free, whereby a quantity of deformation augments. Therefore, the plate spring protrudes from the inner surface of the case, and there might arise a possibility of exerting the adverse influence on the running of the tape.

SUMMARY OF THE INVENTION

It is a primary object of the present invention to provide a tape cassette having a slider lock and capable of enhancing an assembling characteristic with a construction in which a locking force acts even when assembling cases and a slider does not come off during an assembly process.

It is another object of the present invention to provide a tape cassette having a slider lock with such a construction that a spring for the slider lock does not protrude toward an inner surface of the case in states of being fitted and deformed, and does not come into contact with a tape.

It is a further object of the present invention to provide a tape cassette having a slider lock, which is capable of reducing costs for parts and manufacturing costs, wherein a spring for the slider lock is simply structured.

To accomplish the above objects, according to a first aspect of the present invention, a tape cassette comprises a case body including an upper case and a lower case, a recessed portion formed on the side of a lower surface of the case body, a slider so provided in the case body as to be slidable for opening and closing the recessed portion, a lock member positioned at an opening of the lower case to lock the slider in respective positions where the recessed portion is closed and opened, and a biasing member, supported at its two side ends with the opening being interposed therebetween by an inner surface of the lower case, for biasing the slider to a lock position.

In this tape cassette, the biasing member is provided on the side of the lower case, and hence, before being assembled integrally with the upper case, the slider can be surely locked. This locking force prevents the slider from coming off in the assembly process, resulting in an enhanced assembling characteristic. Further, the biasing member supported on both sides with the opening being interposed therebetween biases the lock member positioned at the opening to a non-lock position. Therefore, even when the lock member moves to the non-lock position, resisting the biasing force of the biasing member when unlocked, the biasing member neither protrudes from the inner surface of the case with no particular deformation nor comes into contact with the tape-shaped member within the case body. The tape-shaped member is wound on peripheries of a pair of hubs provided within the case body.

Further, the biasing member may be constructed, when the lock member is in the locking state, so as not to protrude from the inner surface of the lower case. With this construction, when locking by the lock member, the biasing member neither protrudes from the inner surface of the case nor comes into contact with the tape-shaped member.

Support members for supporting the biasing member may be provided on both sides of the opening of the inner surface of the lower case. Based on this configuration, the biasing member is supported by the support members at both ends of the opening and can therefore be attached with a stability to the inner surface of the lower case.

The lock member may have a protruded portion engaged for locking the slider, and the biasing member may be provided in a position corresponding to the protruded portion. The biasing member thereby surely biases the lock member.

The biasing member may be constructed in the form of a plate spring or a wire spring. This makes it feasible to attain a simple configuration of the biasing member and reductions both in the costs for the parts and in the manufacturing costs. Further, when in locking and unlocking of the lock member, the biasing member neither protrudes from the inner surface of the case nor is brought into contact with the tape-shaped member.

The biasing member may be so disposed as to be substantially orthogonal or inclined to the lock member.

According to a second aspect of the present invention, a method of manufacturing a tape cassette by assembling a plate spring as a biasing member into a lower case, comprises a step of making a holding member close to an inner surface of the lower case in a state of holding the plate spring, a step of inserting at first two side ends of the plate spring and the plate spring itself into through-holes of the lower case, a step of making an insertion member proximal to an outer surface of the lower case in a direction opposite to the spring, a step of letting, after the holding member has become very proximal to the inner surface of the lower case, the two side ends of the plate spring pass through the through-holes and the plate spring penetrate therethrough on the side of the outer surface of the lower case, a step of making the insertion member close from the side of the outer surface and receive the two side ends of the plate spring, a step of making the insertion member enter into the through-holes to push the plate spring at the two side ends, and a step of making a release from the holding by the holding member, and pressing the plate spring by a pressing member of the holding member with the result that the two side ends of the plate spring enter in a stretched manner the inner surface of the lower case. Thus, the plate spring can be assembled by pressing the plate spring in two directions.

According to the above method of assembling the plate spring into the lower case, the plate spring can be simply assembled at the respective support member, which can contribute to the reduction in the manufacturing costs. Note that the wire spring classified as the wire member can be similarly assembled instead of the plate spring.

BRIEF DESCRIPTION OF THE DRAWINGS

FIG. 3 is a perspective view showing a state of how a slider of the tape cassette opens in FIG. 2;

FIG. 5A is a plan view showing an inner surface of a lower case when a plate spring is assembled in the lower case; FIG. 5B is a sectional view taken along the line VB—VB in FIG. 5A;

DESCRIPTION OF THE PREFERRED EMBODIMENTS

First through third embodiments of the present invention will hereinafter be discussed with reference to the accompanying drawings.

<First Embodiment>

Figure 1:
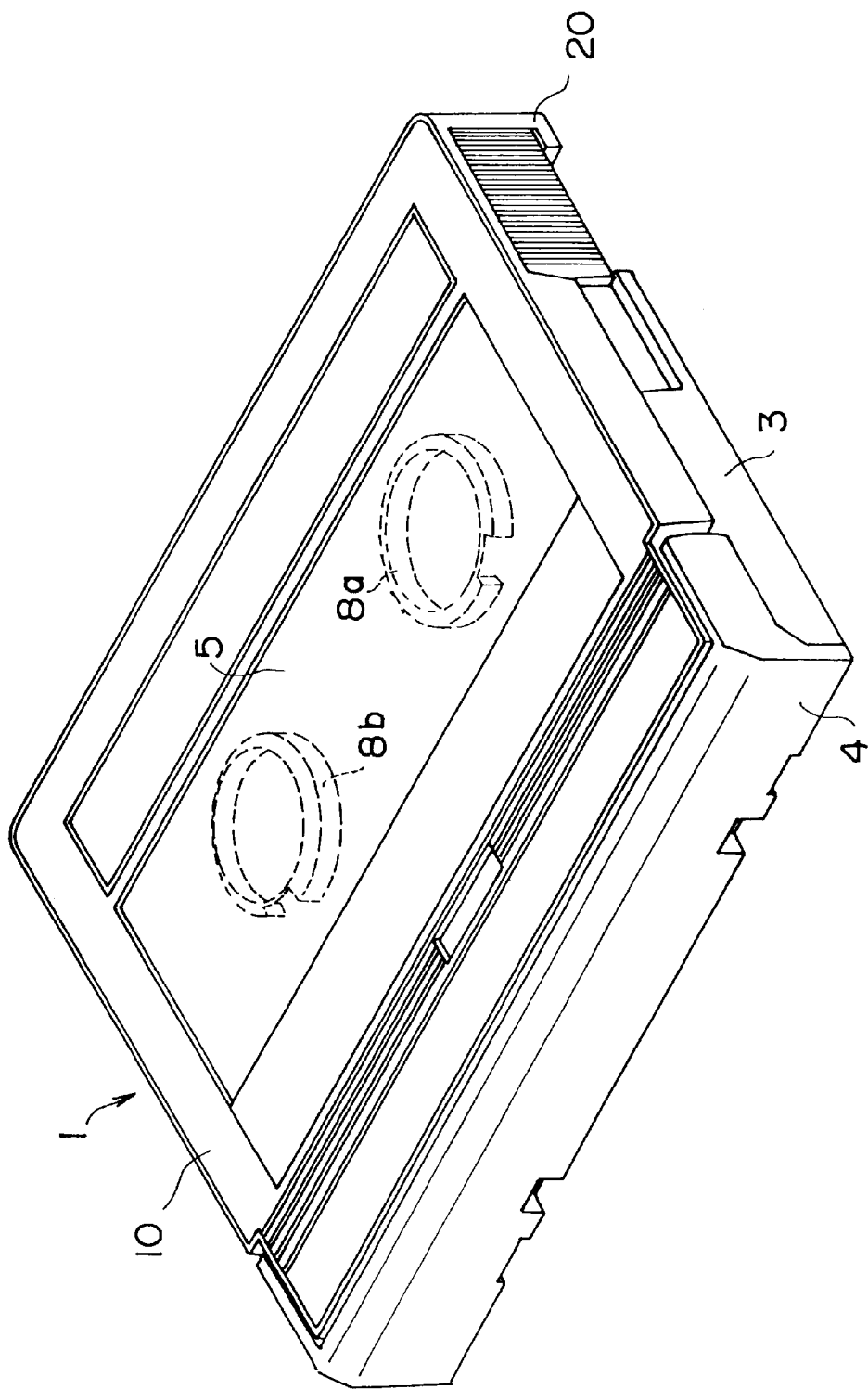
FIG. 1 is a perspective view of a surface side of a tape cassette for a DAT, showing a first embodiment of the present invention.
Figure 2:
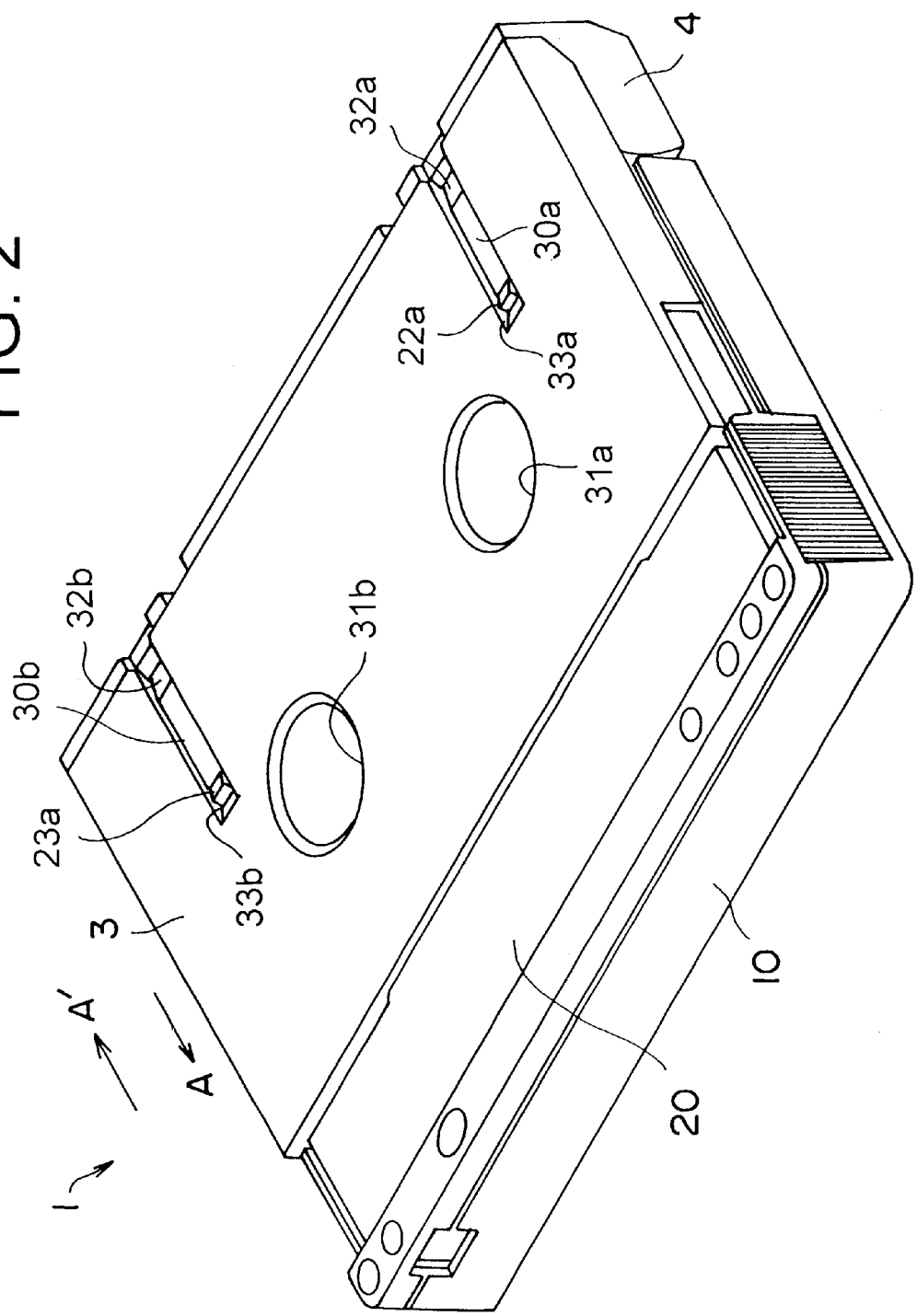
FIG. 2 is a perspective view showing a rear surface side of the tape cassette in FIG. 1.
Figure 4A:
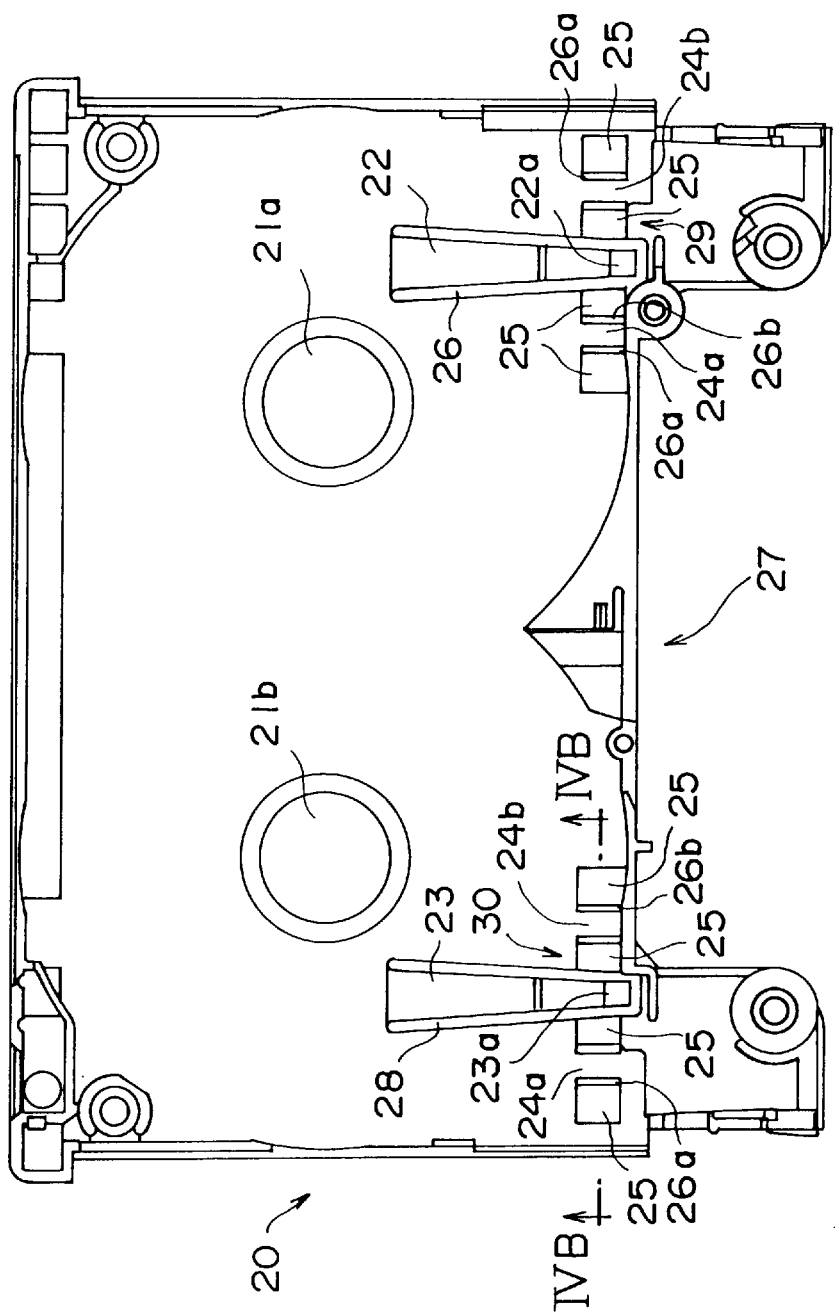
FIG. 4A is a plan view showing an inner surface of a lower case of the tape cassette in FIG. 1.
Figure 4B:
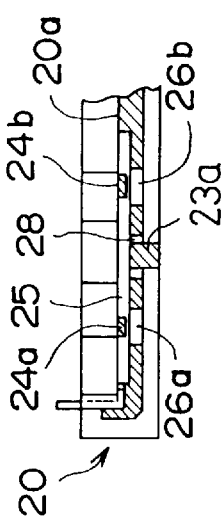
FIG. 4B is a sectional view taken along the line IVB—IVB in FIG. 4A.
Figure 6A:
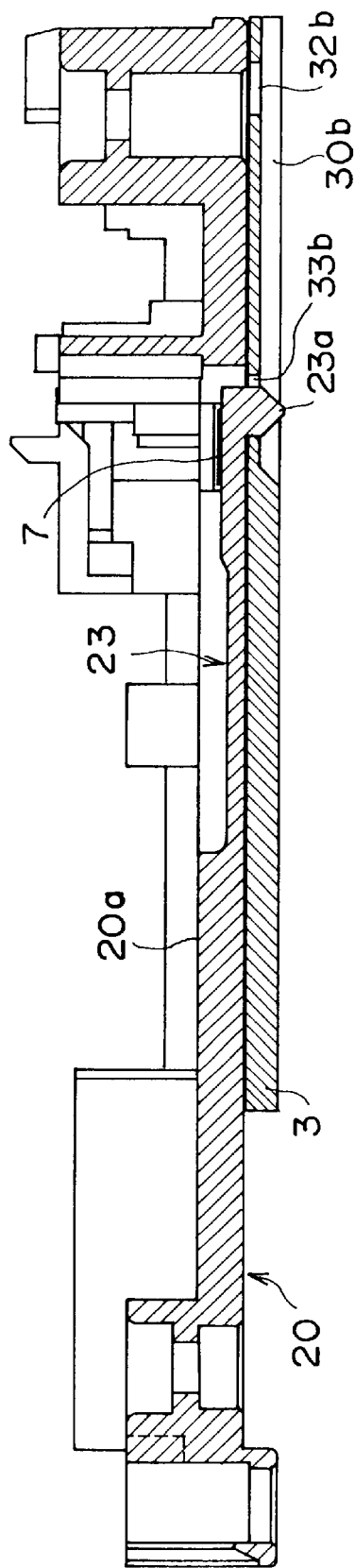
FIG. 6A is a sectional view of the lower case taken along the line VI—VI in FIG. 5A when locked.
Figure 6B:
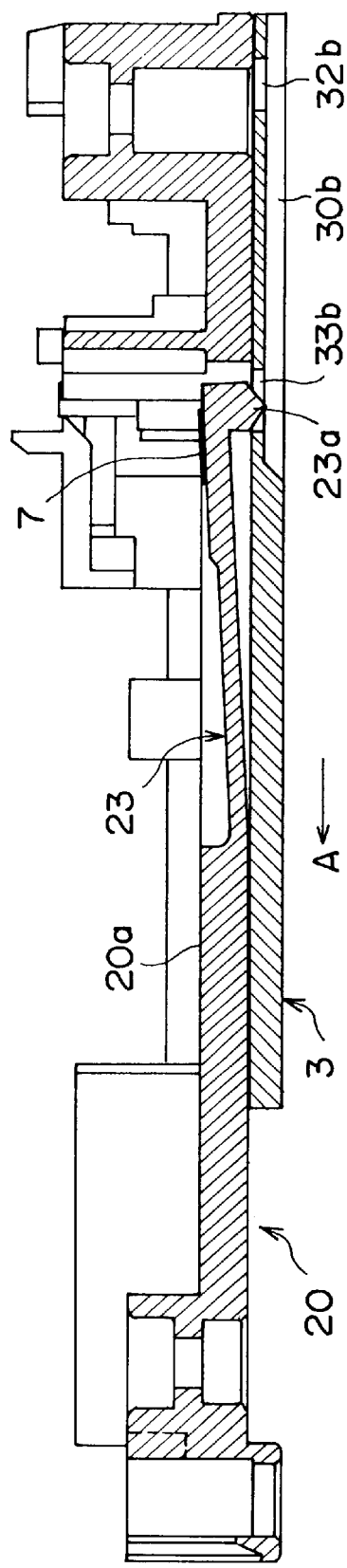
FIG. 6B is a sectional view of the lower case when released from locking.

FIG. 1 is a perspective view of a surface side of a tape cassette for a DAT, illustrating a first embodiment of the present invention. FIG. 2 is a perspective view of a rear surface side thereof. FIG. 3 is a perspective view showing how a slider in FIG. 2 opens. FIG. 4A is a plan view showing an inner surface of a lower case. FIG. 4B is a sectional view taken along the line IVB—IVB. FIG. 5A is a plan view showing an inner surface when a plate spring is assembled into the lower case. FIG. 5B is a sectional view taken along the line VB—VB. FIG. 6A is a sectional view of the lower case when locked, taken along the line VI—VI in FIG. 5A. FIG. 6B is a sectional view showing the lower case when unlocked.

As shown in FIGS. 1–3, a tape cassette 1 includes an upper case 10, a lower case 20, a front cover 4 provided on a front surface side of the upper case 10, a window 5 composed of a light transmitting member formed in a rectangular shape on an upper surface of the upper case 10, and a slider 3 slidably provided on the surface of the lower case 20. Within a body case constructed of the upper case 10 and the lower case 20, there are disposed a pair of hubs 8a, 8b which, with a tape 6 defined as a tape-shaped member wound on peripheries of reels thereof, rotate when in recording/reproducing processes.

Further, as shown in FIGS. 2 and 3, the slider 3 is so provided as to be slidable in directions A and A' to cover the lower case 20, and includes two circular openings 31a, 31b, a pair of shallow grooves 30a, 30b extending in the sliding directions A and A' and formed right and left, and engagement holes 32a, 33a, 32b, 33b provided at respective edge portions in the sliding directions A, A' within the grooves 30a, 30b.

An engagement protruded portion 22a of a lock member 22 (FIG. 4A) engages with the engagement holes 32a, 33a. Similarly, an engagement protruded portion 23a of a lock member 23 (FIG. 4A) engages with the engagement holes 32b, 33b. The lock members 22, 23 are thereby respectively locked. Further, as shown in FIG. 3, a recessed portion 27 for loading the tape 6 by a recording/reproducing apparatus, is formed between the front cover 4 and the slider 3 which slides open in the direction A in FIG. 2. The slider 3 is biased in the direction A' in the Figure by a biasing member (unillustrated) provided within the case body so as to close the recessed portion 27.

As illustrated in FIG. 3, when the tape cassette 1 is set in the apparatus, the slider 3 slides in the direction A in FIG. 2, resisting a biasing force, with the result that the recessed portion 27 is exposed in a space defined by the front cover 4. Then, the cassette is constructed so that the slider 3 thus slides in the direction A in FIG. 2 to open the recessed portion 27, whereby the two circular openings 31a, 31b are aligned with two drive shaft insertion holes 21a, 21b formed in the lower case 20, and the hubs 8a, 8b within the body case can be exposed to the outside of the case. Further, when the tape cassette 1 is not used, the slider 3 slides in the direction A' in FIG. 2, and the recessed portion 27 is closed by the slider 3 and the front cover 4 in combination, whereby the tape 6 accommodated in the recessed portion 27 is not exposed to the outside.

As shown in FIG. 4A, the lower case 20 has a pair of lock members 22, 23 provided right and left integrally with the lower case 20 and gradually tapered toward the engagement protruded portions 22a, 23a at distal ends thereof from proximal ends thereof, and openings 26, 28 formed in the lower case 20 in configurations substantially corresponding to the lock members 22, 23 so that the openings 26, 28 accommodate these lock members 22, 23, and support members 29, 30, respectively disposed on an inner surface 20a of the lower case, for supporting the plate spring 7 (FIG. 5A) on both sides of the openings 26, 28 with these openings 26, 28 being interposed therebetween in the vicinity of the engagement protruded portions 22a, 23a so as to be substantially orthogonal to the lock members 22, 23. The engagement protruded portions 22a, 23a at the distal ends of the lock members 22, 23 respectively engage with the engagement holes 32a, 33a, 32b, 33b of the slider 3, thereby locking the slider 3 in a closing position and an opening position as well.

As shown in FIGS. 4A and 4B, the support member 30 includes a recessed portion 25 recessed from the inner surface 20a of the lower case 20 and so provided as to be substantially orthogonal to the lock member 23. The support member 30 also includes connecting portions 24a, 24b provided on both sides with the lock member 23 being interposed therebetween so that these connecting portions extend from the inner surface 20a in a direction orthogonal to a longitudinal direction of the recessed portion 25, and are so disposed as to bridge the recessed portion 25 to partially cover the recessed portion 25. The support member 30 further includes through-holes 26a, 26b having widths larger than those of the connecting portions 24a, 24b and provided in a position of a groove 25, corresponding to those connecting portions 24a, 24b. Moreover, the plate spring 7 is, as shown in FIG. 5B, received between a bottom surface of the recessed portion 25 and the connecting portions 24a, 24b. Note that the support member 29 also has the same configuration, and therefore the same components as those of the support member 30 are marked with the like numerals, of which the repetitive explanation is omitted.

As illustrated in FIGS. 5A and 5B, the plate springs 7, 7 are incorporated into the recessed portion 25 so as to be held on both sides of the openings 26, 28 by the support members 29, 30. The plate springs 7, 7 so incorporated as to be supported by the support members 29, 30, depress the engagement protruded portions 22a, 23a of the lock members 20 22, 23 positioned respectively within the openings 26, 28, thus biasing these protruded portions in a lock position. Then, as recognizable from FIG. 5B, the plate spring 7 does not protrude from the inner surface 20a of the lower case 20.

A function of the lock member given above will be explained with reference to FIGS. 6A, 6B. The lock member 23, with its engagement protruded portion 23a being thrust by a downward biasing force given from the plate spring 7 in FIG. 7, thus engages with the engagement hole 33b of the slider 3 in a position shown in FIG. 6A, and the slider is thereby clocked in a position of closing the recessed portion 27 (FIG. 3). This locked state indicates a state where the tape cassette 1 is unused. Next, when the tape cassette 1 is set in a recording/reproducing apparatus, operation members (unillustrated) coming from the apparatus thrust upward the engagement protruded portion 23a of the lock member 23 to unlock the slider 3, resisting the biasing force of the plate spring 7 as shown in FIG. 6B, with the result that the slide 3 slides in the direction A in the Figure. At this time, the plate spring 7 is deformed upward in the Figure but does not protrude from the internal surface 20a of the lower case 20. Then, when the slider 3 moves to a position in FIG. 3, the lock member 23 is thrust by a resilient force of the plate spring 7 and engages with the engagement hole 32b, whereby the slider 3 is, as shown in FIG. 3, locked in the position where the recessed portion 27 opens. As shown in FIG. 3, when the recessed portion 27 opens, the front cover 4 becomes rotatable in a rotating direction B shown in FIG. 3 and rotates to have the tape 6 exposed from the front surface of the tape cassette 1. Further, a drive spindle (not shown) is inserted from the apparatus into the hubs 8a, 8b via the openings 31a, 31b of the slider 3 and the insertion holes 21a, 21b of the lower case 20, and then rotationally driven. With this setting, the recording/reproducing process can be executed.

Further, the operation member coming from the apparatus thrusts the engagement protruded portion 23a from the position shown in FIG. 3, resisting the biasing force of the plate spring 7, and the engagement protruded portion 23a disengages from the engagement hole 32b, thereby releasing the slider from the locking by the lock member 23. The slider 3 then slides in the direction A in FIG. 3 by dint of the biasing force of the biasing member, and moves back to the position in FIG. 2. Note that the lock member 22 also operates in the same way as what has been described so far, interlocking with the lock member 23.

As discussed above, when in the locking by the lock members 22, 23, the plate spring 7 is so positioned as to be interposed between the recessed portion 25 and the connecting portions 24a, 24b of the lower case 20 as well as being brought into contact with the connecting portions 24a, 24b and the recessed portion 25. At the same time, the plate spring 7 is supported by the support members 29, 30 on both sides thereof with the openings 26, 28 being interposed therebetween, thereby surely biasing and thrusting the lock members 22, 23 to a lock position (shown in FIG. 6A). This ensures the locking of the lock members 22, 23 in the respective engagement holes, and the plate spring 7 neither might protrude from the inner surface 20a of the lower case 20 nor might come into contact with the tape.

Further, when released from the locking by the lock members 22, 23, the lock members 22, 23 come to non-lock positions (shown in FIG. 6B) upon thrusting the engagement protruded portions 22a, 23a. Then, the plate spring 7 is supported at side ends by the connecting portions 24a, 24b, and deformed in concentration at its contact portions with the engagement protruded portions 22a, 23a. The plate spring 7, however, produces a resilient force of returning to an original position and is therefore capable of automatically returning to the lock position. In this case, the plate spring 7, with it two side ends being supported by the connecting portions 24a, 24b and a deformation quantity thereof being restricted, neither protrude from the inner surface 20a of the lower case 20 nor comes into contact with the tape.

Further, the lower case 20 is provided with the plate spring 7 serving as a biasing member, and hence the slider 3 can be surely locked before being assembled integrally with the upper case 10. This locking force prevents the slider from coming off during the assembly process, thereby enhancing, as a preferable aspect, an assembling characteristic.

Note that the plate spring 7 is composed of a plate-like member, of which a configuration is a simple rectangle, and costs for parts can be therefore restrained small, which is considered preferable. Moreover, a material of the plate spring 7 may include plastics (PET and PP) other than metals. Further, a thickness of the plate spring 7 is, though its width has an influence, on the order of 0.005 mm in the case of the metal and 0.3 mm or smaller in the case of the plastic, so that there does not arise the problem of protruding from the inner surface 20a of the lower case 20 and coming into contact with the tape 6.

Figure 7A:
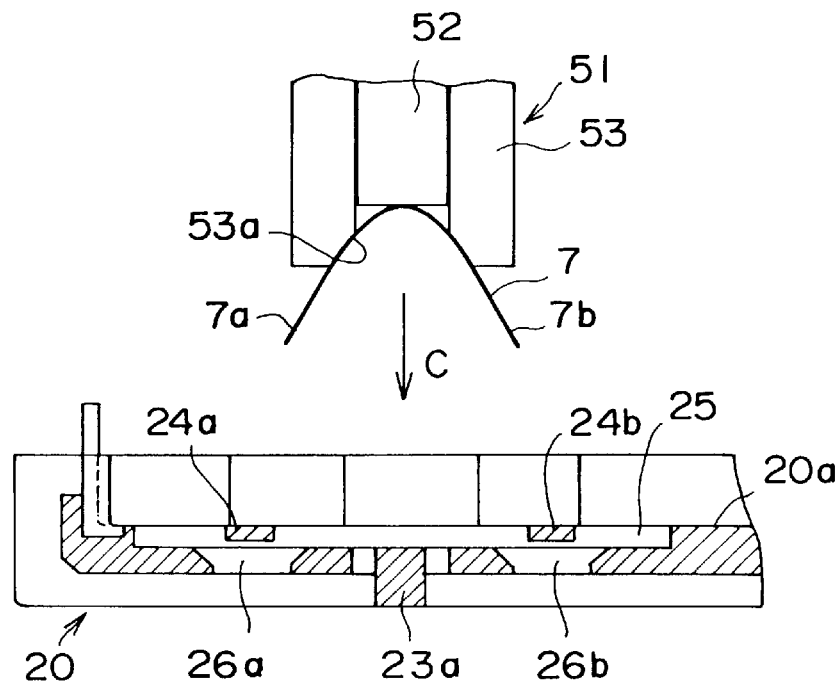
FIGS. 7A, 7B, 7C and 7D are side views showing respective processes of an assembling method of assembling the plate spring shown in FIGS. 5A and 6A into the lower case illustrated in FIG. 4A.

Next, a method of assembling the plate spring 7 into the lower case 20 will be explained referring to FIGS. 7A, 7B, 7C and 7D. As shown in FIG. 7A, the plate spring 7 is sucked by vacuum through, e.g., a pressing portion 52 and held by a holding member 51 provided upwardly of the lower case 20 in a state of coming into contact with a recessed curve surface 53a of a side member 53 as well as in a state of deforming substantially in an inverted-U shape. The holding member 51 descends in a direction C in the Figure toward the inner surface 20a of the lower case 20 while thus holding the plate spring 7.

Figure 7B:
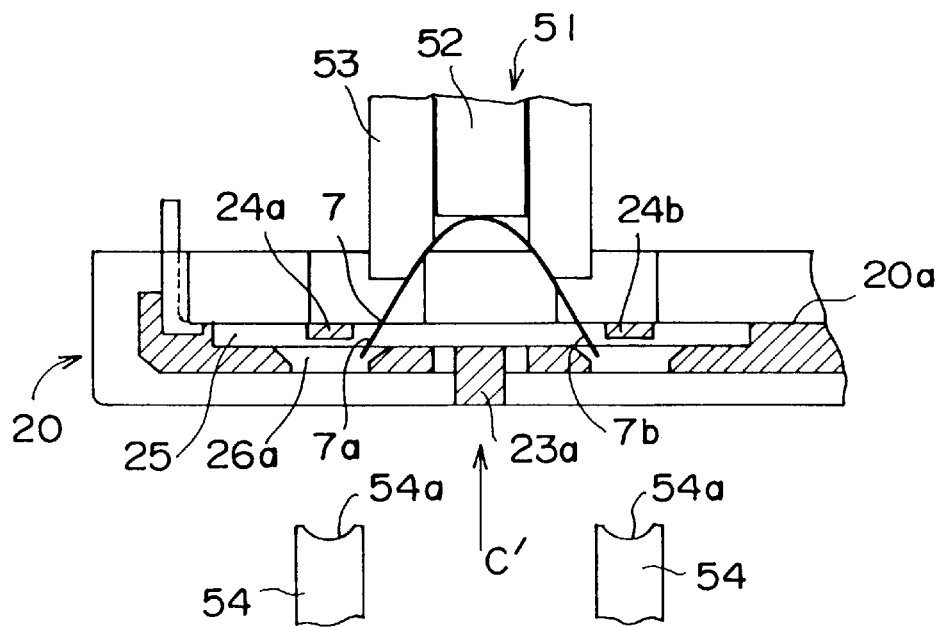

With this descent, as shown in FIG. 7B, the two side end portions 7a, 7b of the plate spring 7 are inserted respectively into the through-holes 26a, 26b from the side of the engagement protruded portion 23a of the lock member. Further, a pair of insertion members 54 having substantially U-shaped recessed curve surfaces 54a rise in a direction C' in the Figure and get close to the outer surface of the lower case 20.

Figure 7C:
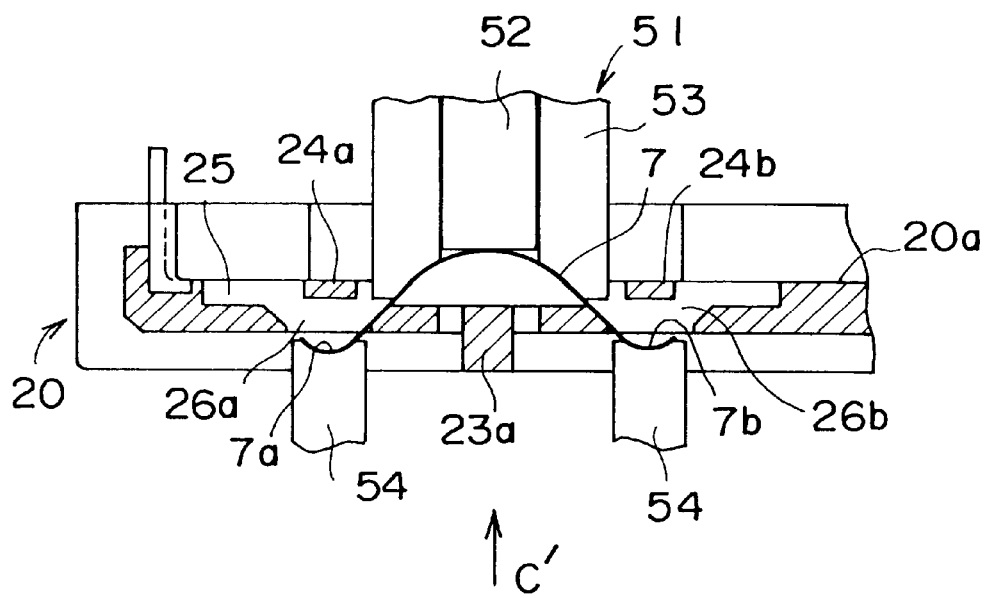

As illustrated in FIG. 7C, when the holding member 51 descends down to the lowest position, the held two side end portions 7a, 7b of the plate spring 7 pass through the through-holes 26a, 26b and thus penetrate on the side of the outer surface of the lower case 20. At the same time, the insertion member 54 rises father in a direction C', and the recessed curve surface 54 thereof receives the two side end portions 7a, 7b. The recessed curve surface 54a of the insertion member 54 deforms the side end portions 7a, 7b in a U-shape so that the plate spring 7 can be inserted into the through-holes 26a, 26b.

Figure 7D:
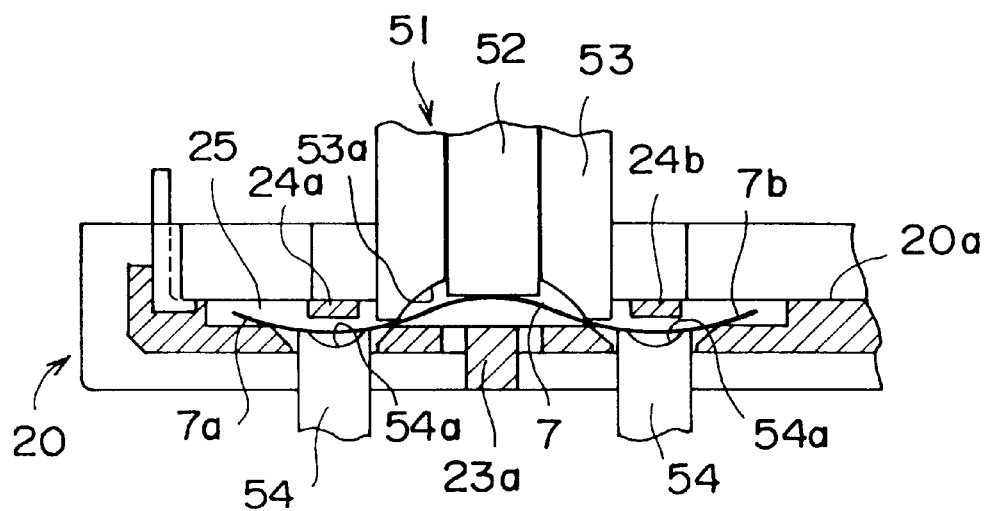

Next, as shown in FIG. 7D, the insertion member ascends father and enters the through-holes 26a, 26b, at which time the insertion member 54 pushes the plate spring 7 upward with its two side end portions 7a, 7b. At the same time, the vacuum suction of the holding member 51 stops, and the pressing member 52 thereof presses the plate spring 7 downward in the Figure, whereby the two side end portions 7a, 7b each enters the recessed portion 25 toward its two side end portions in the Figure. The plate spring 7 is thus pressed in the up and down directions, thereby completing the assembly of the plate spring 7.

According to the thus schemed method of assembling the plate spring, the plate spring 7 can be simply assembled in between the recessed portion 25 and the connecting portions 24a, 24b in the respective support members 29, 30, which can contribute to the reduction in the manufacturing costs. Note that a wire spring defined as a wire member may be similarly disposed in place of the plate spring 7. In this case, based on the assembly method shown in FIGS. 7A to 7D, the holding member is structured to hold the wire spring, and the wire spring can be likewise assembled. Further, a construction as will be exemplified in a third embodiment which follows may also be adopted.

<Second Embodiment>

Figure 8:
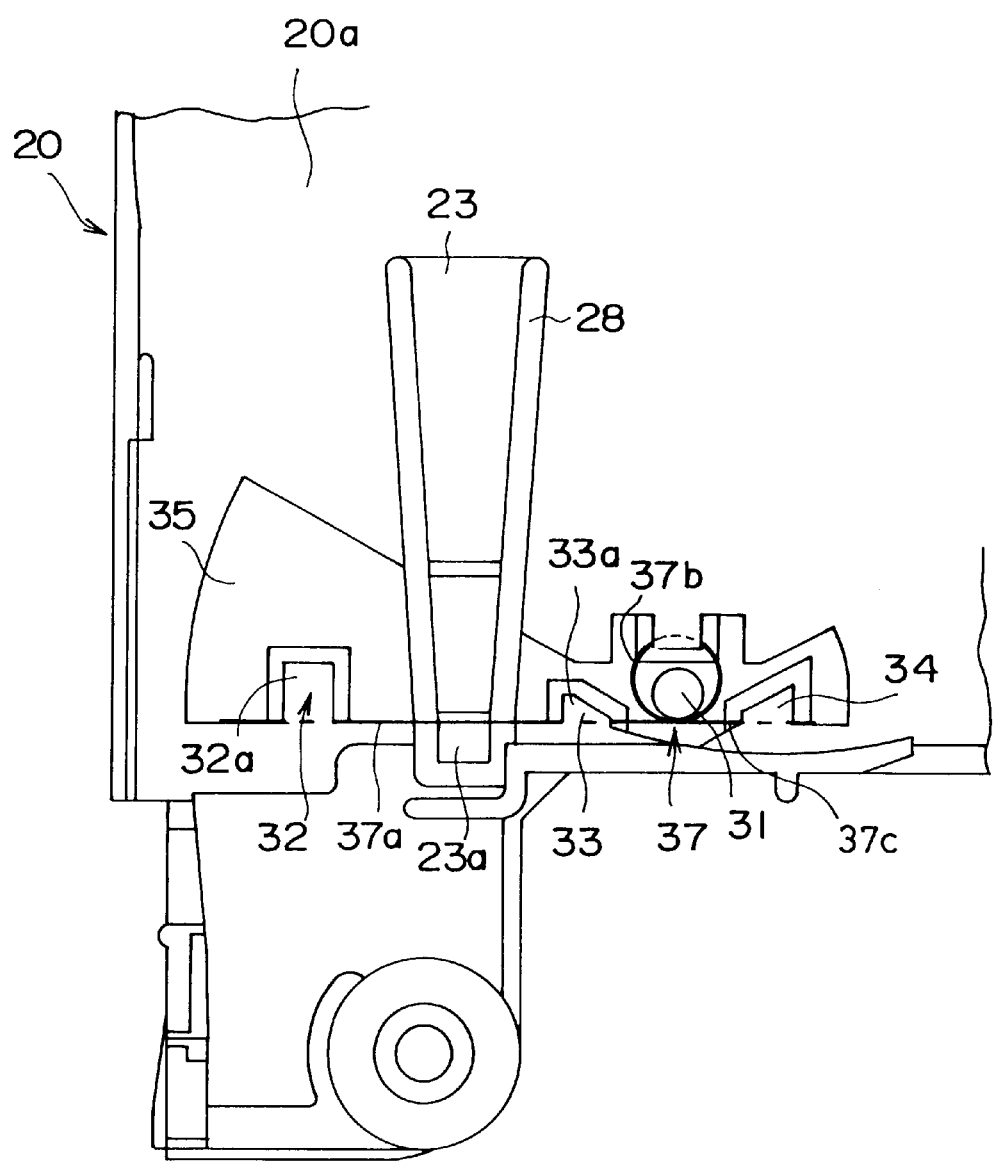
FIG. 8 is a partial plan view showing the inner surface of the lower case of the tape cassette in a second embodiment of the present invention.
Figure 9:
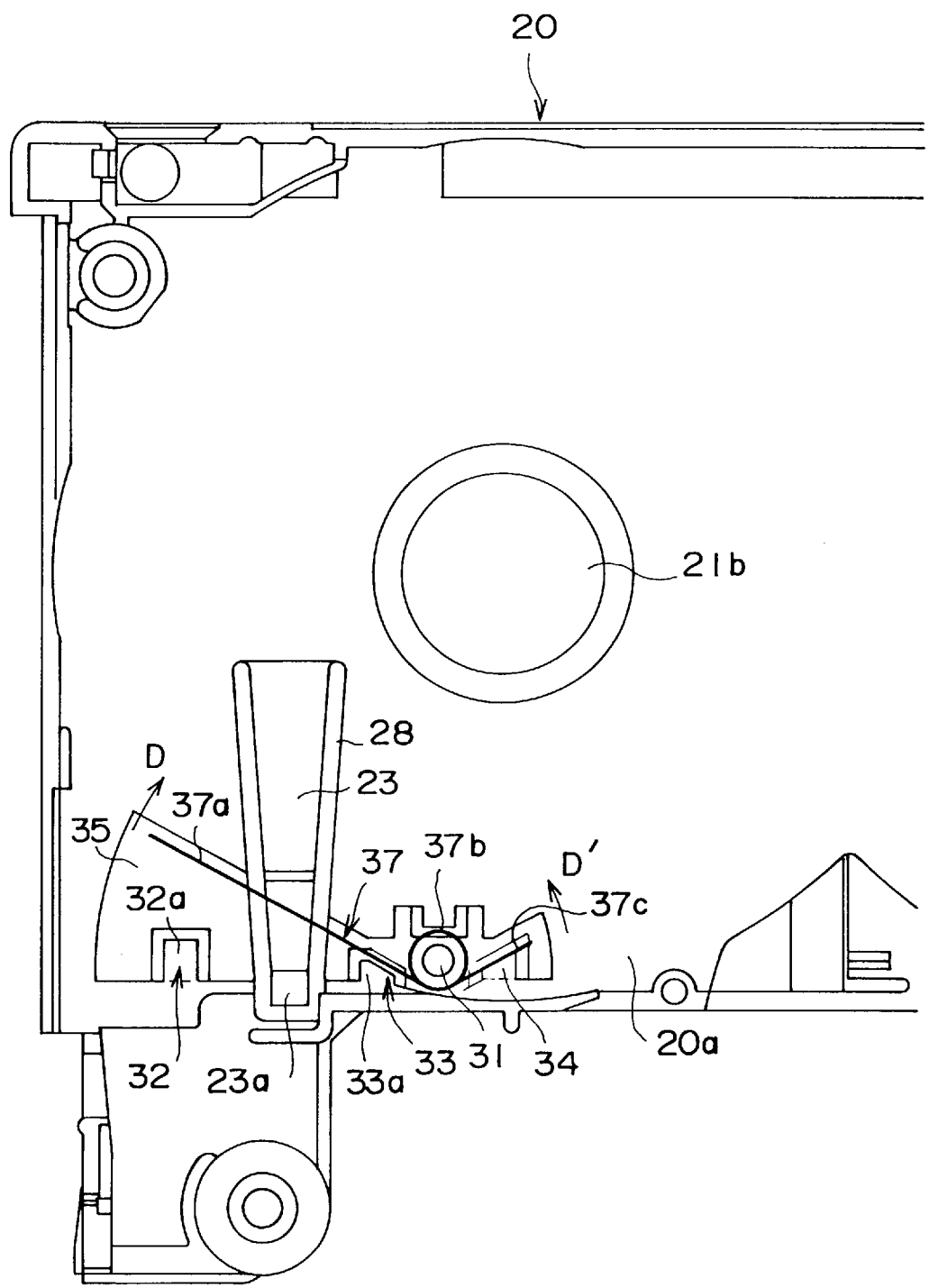
FIG. 9 is a partial plan view showing how a torsion spring is assembled into the lower case.
Figure 10:
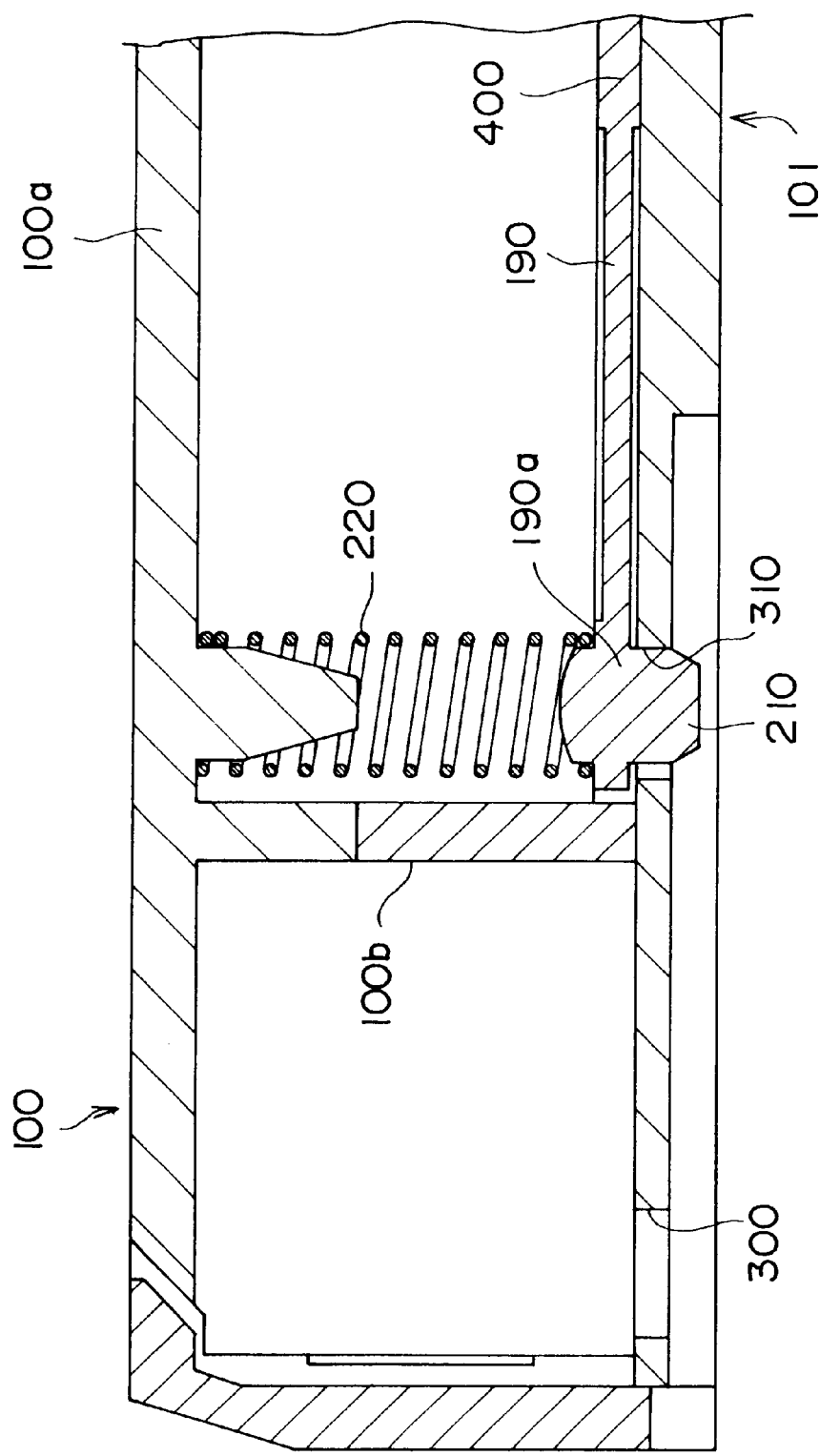
FIG. 10 is a sectional view showing a principal portion of a conventional tape cassette.
Figure 11A:
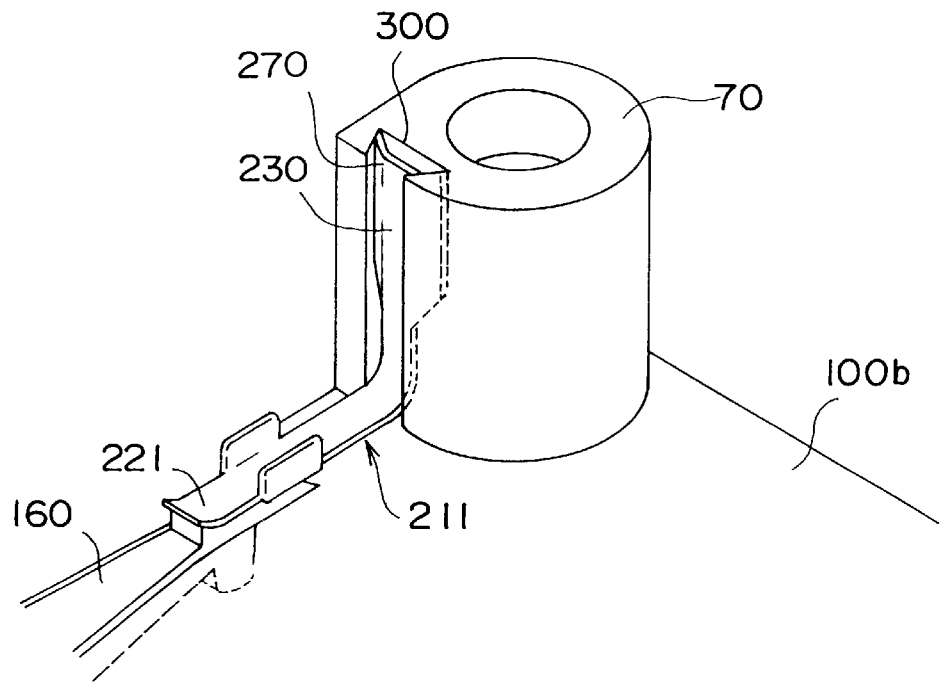
FIG. 11A is a perspective view showing a principal portion of another conventional tape cassette.
Figure 11B:
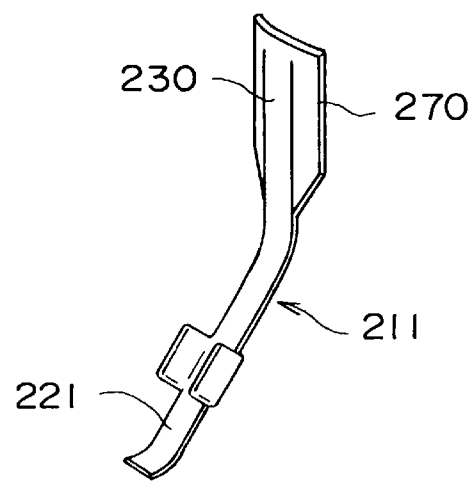
FIG. 11B is a perspective view showing a plate spring 210 in FIG. 11A.
Figure 12A:
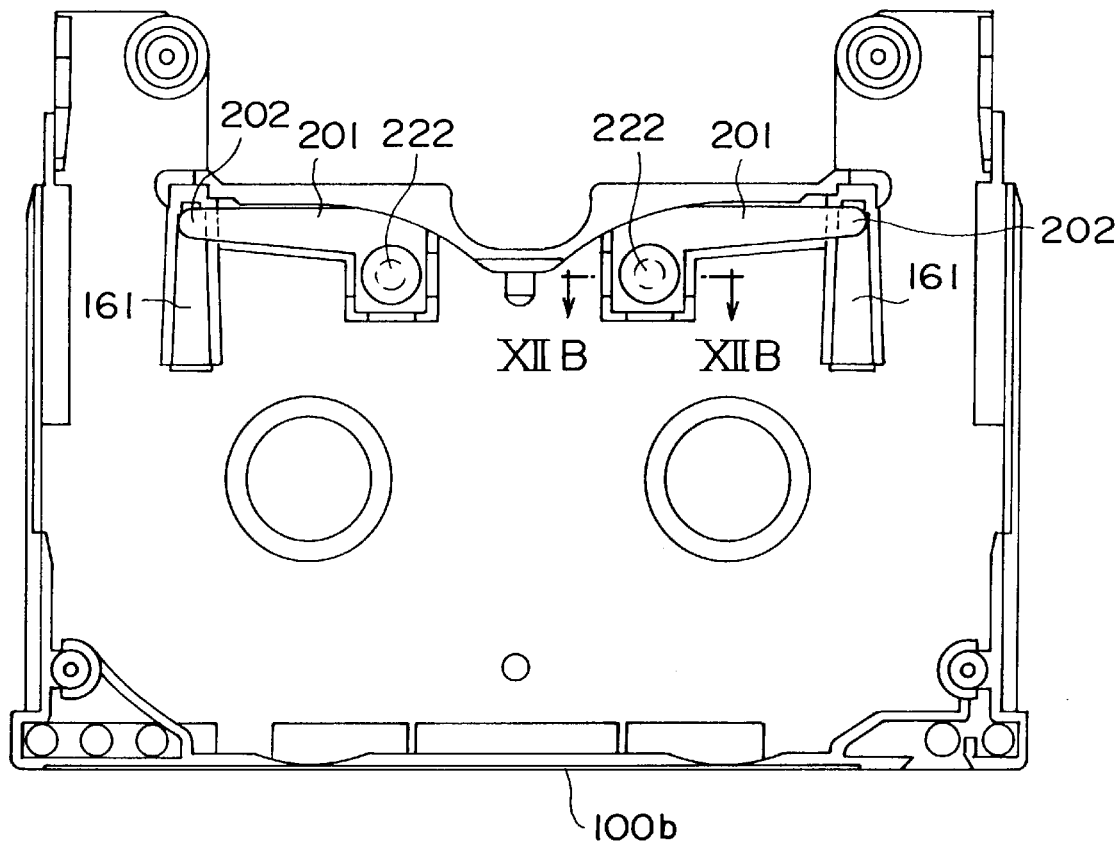
FIG. 12A is a plan view showing a lower case of still another conventional tape cassette.
Figure 12B:
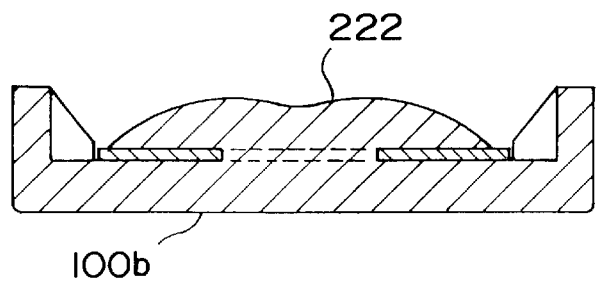
FIG. 12B is a sectional view taken along the line XIIB—XIIB in FIG. 12A.

A second embodiment of the present invention has the same construction as the first embodiment except that a torsion spring is used as a biasing member instead of the plate spring used in the first embodiment, and hence the same components are marked with the like numerals, of which the repetitive explanation is herein omitted. FIG. 8 is a principal plan view of the inner surface of the lower case, showing the second embodiment. FIG. 9 is a principal plan view showing how the wire spring in FIG. 8 is assembled.

As shown in FIG. 8, the inner surface of the lower case 20 is formed with a recessed portion 35 taking a fan-shape suited to receive an insertion of a wire spring member 37a of the torsion spring 37, a first support member 32 for supporting the wire spring member 37a entering between the recessed portion 35 and a protruded member 32a, a second support member 33, disposed on the opposite side to the first support member 32 with the engagement protruded portion 23a of the lock member 23 being interposed therebetween, for supporting the wire spring member 37 entering between the recessed portion 35 and a protruded member 33a, a support spindle 31 for supporting a coil spring member of the torsion spring 37 which is inserted therein, and a support member 34 for supporting a wire spring member 37c at the other end of the torsion spring 37 which enters therein.

As illustrated in FIG. 9, when the torsion spring 37 is assembled to the inner surface 20a of the lower case 20, the coil spring member 37b is inserted in the support spindle 31, and the wire spring member 37a is slightly rotated in shrinkage in a rotating direction D while being pressed, and the wire spring member 37c provided at the other end thereof is somewhat rotated in shrinkage in a rotating direction D' while being pressed. Thereafter, when releasing the two side ends portions, the wire spring member 37a enters between the recessed portion 35 and the protruded member 32a along the bottom surface of the recessed portion 35, and is thus supported by the first support member 32, and also enters between the recessed portion 35 and the protruded member 33a and is thus supported by the second support member 33. Moreover, the wire spring member 37c provided at the other end is supported by the support member 34. Thus, the torsion spring 37 in the second embodiment can be assembled into the lower case 20. Note that a geometry on the side of the lock member 22 is the same, and the same torsion spring 37 can be assembled into the lower case 20.

In the torsion spring 37 according to the second embodiment, as in the first embodiment, the engagement protruded portion 23a of the lock member 23 is biased to the lock position by the wire spring member 37a disposed in the direction substantially orthogonal to the lock member 23, thereby surely locking the lock member 23. At the same time, the wire spring member 37a is accommodated in the recessed portion 35 and does not protrude from the internal surface 20a of the lower surface 20 with no possibility of coming into contact with the tape. Further, when in the unlocking process, the wire spring member 37a, though deformed resisting the biasing force, the two side ends of this wire spring member are supported by the first and second support members 32, 33, and a quantity of this deformation is restricted. Hence, the wire spring member 37a neither protrudes from the inner surface 20a of the lower case 20 nor comes into contact with the tape.

Furthermore, the torsion spring 37 is provided in the lower case 20, and therefore, before being assembled integrally with the upper case 10, the slider 3 can be surely locked. This locking force prevents the slider 3 from coming off in the assembling process, thereby enhancing, as it may be preferable, the assembling characteristic. Further, the torsion spring 37 is manufactured from the metal wire material, of which a configuration is simple, and it may therefore be preferable that the costs for the parts can be restrained small.

<Third Embodiment>

A third embodiment of the present invention has the same construction as the first embodiment except that a wire spring (a wire member) is usable as a biasing member in place of the plate spring in the first embodiment, and therefore the same components are marked with the like numerals, of which the repetitive explanation is omitted. FIGS. 13A, 13B, 13C and 13D are a partial plan view showing the inner surface of the lower case of the tape cassette in the third embodiment, and sectional views taken along the line BB—BB, the line CC—CC and the line DD—DD.

Figures 13A, 13B:
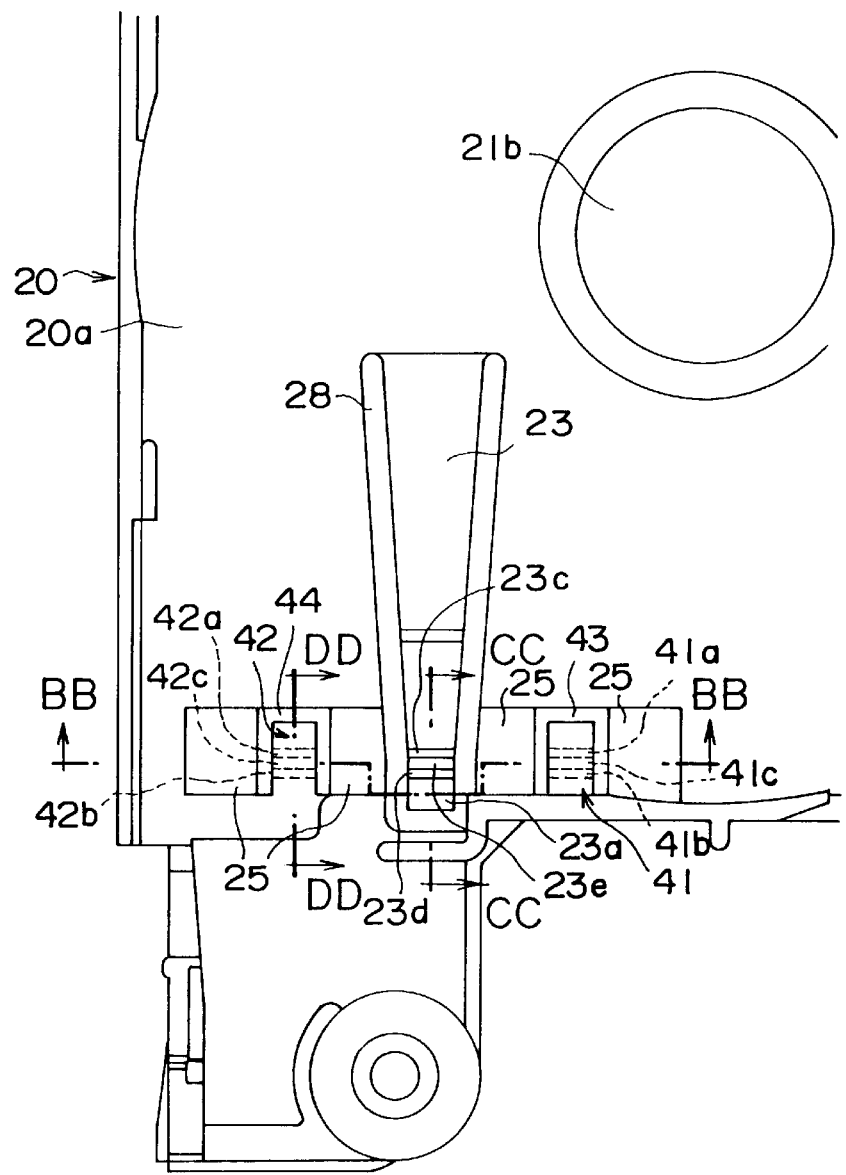
FIG. 13A is a partial plan view showing the inner surface of the lower case of the tape cassette in a third embodiment of the present invention.
FIG. 13B is a sectional view taken along the line BB—BB in FIG. 13A.

As shown in FIG. 13A, the connecting portions 41, 42 are, as in the first embodiment, provided on both sides of the lock member 23, and protrude in a cantilever type with some portions notched, and gaps 43, 44 are formed between the lower case 20 and the inner surface 20a. Protrusions 42a, 42b protruding on the side of the recessed portion 25 are, as shown in FIG. 13D, provided on the side of the inner surface of the connecting portion 42 for surely holding the wire spring 47 (FIG. 13B), and a holding portion 42c for receiving and holding the wire spring 47 is formed between the protrusions 42a, 42b. The protrusions 42a, 42b have vertical surfaces on the side of the holding portion 42c and inclined surfaces on the opposite side. With this configuration, the wire spring 47 is easy to assemble but hard to come off. Further, as shown in FIG. 13A, similar protrusions 41a, 41b and a similar holding portion 41c are formed on the side of the inner surface of the connecting portion 41.

Figure 13C:
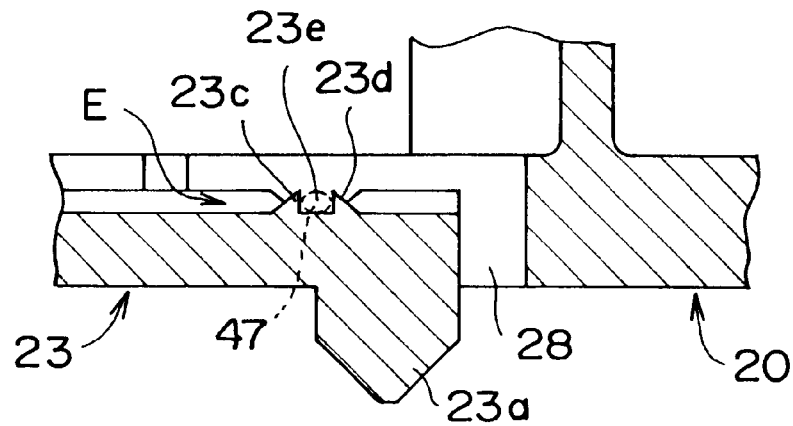
FIG. 13C is a sectional view taken along the line CC—CC in FIG. 13A.
Figure 13D:
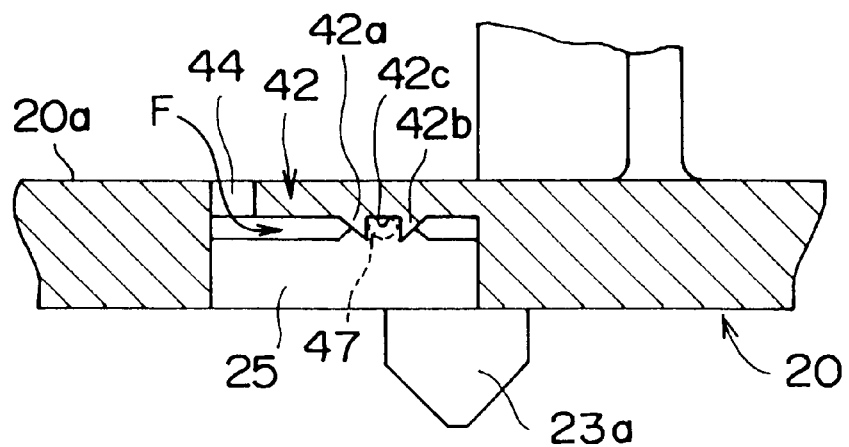
FIG. 13D is a sectional view taken along the line DD—DD in FIG. 13A.

Moreover, as illustrated in FIGS. 13A and 13C, for surely holding the wire spring 47, protrusions 23c, 23d are provided in the vicinity of the engagement protruded portion 23a of the lock member 23 and protrude on the side of an opposite surface thereof, and a holding portion 23e for receiving and holding the wire spring 47 is formed between the protrusions 23c, 23d. The protrusions 23c, 23d have vertical surfaces on the side of the holding portion 23e and inclined surfaces on the opposite side. With this configuration, the wire spring 47 is easy to assemble but hard to come off. Note that the connecting portions, the protrusions and the holding portions described above are provided likewise on the side of the lock member 22 (FIG. 4A). Note that the wire spring 47 maybe composed of a spring steel wire like a piano wire and may also be composed of other materials.

In the case of assembling the wire spring 47, the wire spring 47 is made close to the protrusion 23c in a direction E as shown in FIG. 13C with respect to the lock member 23 from the side of the inner surface 20a of the lower case 20, then moved over the inclined surface and is thus accommodated in the holding portion 23e. On the other hand, with respect to the connecting portions 41, 42, the wire spring 47 is made proximal to the protrusions 41a, 42a through the gaps 43, 44 in a direction F as shown in FIG. 13D, then moved over the inclined surface and thus accommodated in the holding portions 41c, 42c. In this way, the wire spring 47 indicated by a broken line in FIG. 13B can be assembled into the recessed portion 25 in a state where the wire spring 47 does not protrude from the inner surface 20a of the lower case 20.

According to the third embodiment discussed above, the wire spring 47 is supported at its two side ends by the connecting portions 41, 42 when released from the locking by the lock member 23, and the deformation quantity thereof is restricted. Hence, the wire spring 47 neither might protrude from the inner surface 20a of the lower case 20 nor might come into contact with the tape. Moreover, the wire spring 47 is certainly held by the lock member and the holding portions provided respectively in the connecting portions, and does not come off. Moreover, the wire spring 47 is provided in the lower case 20, and hence, before being assembled integrally with the upper case 10, the slider 3 can be surely locked. This locking force prevents the slider 3 from coming off in the assembling process, whereby the assembling characteristic is enhanced as a preferable aspect. Note that the wire spring 47 is composed of the wire member and can be manufactured simply by cutting the wire member, so that the costs for the parts can be restrained small as its preferable aspect.

The present invention has been discussed so far by way of the embodiments but is not limited to those embodiments, and a variety of modifications may be carried out within the scope of the technical concept of the present invention. For example, the plate spring, the wire spring and the wire spring member each serving as the biasing member are so provided as to be substantially orthogonal to the lock member and may also be provided with inclinations thereto. Further, the application of the tape cassette is not confined to the DDS and the DAT, and the tape cassette may be, if having the slider lock, used for other applications. Moreover, the tape-shaped member may, as a matter of course, embrace, e.g., a cleaning tape other than the recording medium tape.

What is claimed is:

1. A tape cassette comprising:
    a case body including an upper case and a lower case;
    a recessed portion formed on the side of a lower surface of said case body;
    a slider so provided in said case body as to be slideable for opening and closing said recessed portion;
    a lock member positioned at an opening of said lower case to lock said slider in respective positions where said recessed portion is closed and opened; and a biasing member, supported at its two side portions in an inner surface of said lower case so as to interpose the opening between the two side portions, for biasing said lock member to a lock position.

2. A tape cassette according to claim 1, wherein said biasing member is constructed so as not to protrude from the inner surface of said lower case when said lock member is in a locking state.

3. A tape cassette according to claim 1, wherein support members for supporting said biasing member are provided on both sides of the opening of the inner surface of said lower case.

4. A tape cassette according to claim 3, wherein the inner surface of said lower case is formed with a recessed portion for receiving said plate spring serving as said biasing member, said support member has connecting portions so provided as to partially cover said recessed portion, said connecting portions support the two side ends of said plate spring when said plate spring within said recessed portion biases said lock member to a lock position.

5. A tape cassette according to claim 3, wherein said wire spring member of said torsion spring as said biasing member is biased by a coil spring of said torsion spring and interposed in between said recessed portion formed in the inner surface of said lower case and said protruded member as said support member.

6. A tape cassette according to claim 1, wherein the inner surface of said lower case is provided with a recessed portion in which said wire spring as said biasing member is positioned, said support member includes connecting portions partially covering said recessed portion and protrude in a cantilever type with gaps being formed, and first holding portions for holding said wire spring inserted via the gaps of said connecting portions, are provided on surfaces of said connecting portions on the side of said recessed portion.

7. A tape cassette according to claim 6, wherein second holding portions for holding said wire spring are provided in said lock member on the side of the inner surface of said lower case.

8. A tape cassette according to claim 1, wherein said lock member has a protruded portion engaged for locking said slider, and said biasing member is provided in a position corresponding to said protruded portion.

9. A tape cassette according to claim 1, wherein said biasing member is constructed in the form of a plate spring or a torsion spring or a wire spring.

10. A tape cassette according to claim 1, wherein said biasing member is substantially orthogonal to said lock member.

11. A tape cassette according to claim 1, wherein said biasing member is inclined to said lock member.

12. A tape cassette according to claim 1, wherein said tape cassette is used for a DDS (Digital Data Storage) or a DDT (Digital Audio Tape).

13. A method of manufacturing a tape cassette according to any one of claims 1 to 12 by assembling a plate spring as a biasing member into a lower case, said method comprising the steps of:

making a holding member close to an inner surface of said lower case in a state of holding said plate spring;

inserting at first two side ends of said plate spring and said plate spring itself into through-holes of said lower case;

making an insertion member proximal to an outer surface of said lower case in a direction opposite to said spring;

letting, after said holding member has become very proximal to the inner surface of said lower case, the two side ends of said plate spring pass through said through-holes and said plate spring penetrate therethrough on the side of the outer surface of said lower case;

making said insertion member close from the side of the outer surface and receive the two side ends of said plate spring;

making said insertion member enter into the through-holes to push said plate spring at the two side ends; and making a release from the holding by said holding member, and pressing said plate spring by a pressing member of said holding member with the result that the two side ends of said plate spring enter in a stretched manner the inner surface of said lower case.

* * * * *